Jan. 29, 1974 O. ECKERLE Re. 27,904

WEAR (AND TEAR-) COMPENSATING HICH-PRESSURE GEAR PUMP

Original Filed Aug. 29, 1968 5 Sheets-Sheet 1

INVENTOR
Otto Eckerle

BY Otto John Munz

ATTORNEY

WEAR (AND TEAR-) COMPENSATING HICH-PRESSURE GEAR PUMP

Original Filed Aug. 29, 1968 5 Sheets-Sheet 2

INVENTOR
Otto Eckerle
BY Otto John Munz
ATTORNEY

WEAR (AND TEAR-) COMPENSATING HIGH-PRESSURE GEAR PUMP

Original Filed Aug. 29, 1968

INVENTOR
Otto Eckerle
BY Otto John Kurz
ATTORNEY

WEAR (AND TEAR-) COMPENSATING HIGH-PRESSURE GEAR PUMP

Original Filed Aug. 29, 1968 5 Sheets-Sheet 4

INVENTOR
Otto Eckerle
BY Otto John Munz
ATTORNEY

WEAR (AND TEAR-) COMPENSATING HIGH-PRESSURE GEAR PUMP

Original Filed Aug. 29, 1968 5 Sheets-Sheet 5

INVENTOR
Otto Eckerle
BY Otto John Munz
ATTORNEY

United States Patent Office

Re. 27,904
Reissued Jan. 29, 1974

27,904
WEAR COMPENSATING HIGH-PRESSURE GEAR PUMP

Otto Eckerle, Am Bergwald 3, 75 Malsch, Germany

Original No. 3,525,581, dated Aug. 25, 1970, Ser. No. 756,169, Aug. 29, 1968. Application for reissue Feb. 2, 1973, Ser. No. 329,109
Claims priority, application Germany, Sept. 1, 1967, P 16 53 827.5
Int. Cl. F01c *1/10;* F03c *3/00;* F04c *1/06*
U.S. Cl. 418—71 12 Claims

Matter enclosed in heavy brackets [ ] appears in the original patent but forms no part of this reissue specification; matter printed in italics indicates the additions made by reissue.

ABSTRACT OF THE DISCLOSURE

Wear [and tear-] compensating [heavy-duty] *high-pressure* gear pump comprising a driven externally-geared pinion, a concomitantly rotating internally-geared [wheel] *ring,* a [movable] *pivotable* sickle-shaped filler member between the pinion and the internal gear *ring,* and [either one or] two axial disks laterally covering the gears, as well as [an insert member called] *a* "control piston" being disposed on the pressure side of the gears and radially displaceably arranged with respect thereto, enclosing the outer circumferential surface of the internal gear *ring* within a specific angular range and [touching] *positioning* the latter [as the sole stator part], said control piston containing the first portion of the [pressure] *fluid* outlet duct, *the control piston* being [relieved for the major part with respect to radial forces] *subjected to a radial pressure compensation field* and hence pressing against the circumference of the internal gear *ring* with [only] a limited [excess] force, characterized in that the control piston [(6)] is [rotatably but not displaceably] *pivotably arranged inside the housing, the pivot point being* positioned in proximity to the tooth engagement of the two gears [(2, 3)] *and* that the [center of rotation] *pivot point* is disposed outside of the [relieving] *pressure compensation* field [(12) being under pressure] between the internal gear *ring* [(2)] and the control piston, and in that the [relieving] *pressure compensation* field is so [provided] *arranged* that the surface [center of gravity (S)] *centroid* thereof is positioned above the [line of application or effective curve ($W_L$)] *center line* of the radial [compensating forces] *hydraulic thrust on the internal gear ring.*

BACKGROUND OF THE INVENTION

Field of the invention

The present invention relates to a wear [and tear-] compensating high-pressure gear pump comprising a driven externally-geared pinion, a concomitantly rotating internally-geared [wheel] *ring,* a [movable] *pivotable* sickle-shaped filler member between the pinion and the internal gear *ring,* and [either one or] two axial disks laterally covering the gears, as well as [an] *a* [insert member called] "control piston" being disposed on the pressure side of the gears and radially displaceably arranged with respect therto, enclosing the outer circumferential surface of the internal gear *ring* within a specific angular range and [touching] *positioning* the latter [as the sole stator part, which control piston contains the first portion of the pressure outlet duct, is relieved for the major part with respect to radial forces and hence presses against the circumference of the internal gear with only a limited excess force].

Descripiton of the prior art

In the known pumps of this type, the internal gear *ring* is supported, on the one hand, [in tooth engagement in the] *against the tooth* flanks of the pinion and, on other hand, [with its addendum circle diameter on the movably] *by its toth crowns on the pivotably* disposed filler member. The gears rotate therefore without flank clearance and must be manufactured with extreme precision.

SUMMARY OF THE INVENTION

The present invention maintains the feature regarding the support of the internal gear *ring* with its [addendum circle diameter] *tooth crowns* on the filler member whereas the support of the internal gear *ring* on the flanks of the pinion [shaft in] *via* the tooth engagement is disposed with. Therefore, the gears need no longer be made with such accuracy since, in contrast to the known pumps, the [gearing rotates] *gears rotate* with flank clearance.

For this purpose the control piston is [rotatably but not displaceably] *pivotably arranged inside the housing, the pivot point being* positioned in proximity to the tooth engagement of the two gears, [the center of rotation is arranged] *but* outside of the [relieving] *pressure compensation* field [being under pressure] between the internal gear *ring* and the control piston, and the [relieving] *pressure compensation* field is so [provided] *arranged* that [the center of gravity of its surface] *its area centroid* is located above the [line of application, or effective curve,] *center line* of the radial [compensating forces] *hydraulic thrust.*

BRIEF DESCRIPTION OF THE DRAWINGS

Several embodiments of the present invention are illustrated in the accompanying drawings, wherein like elements are identified with the same reference numerals.

DESCRIPTION OF THE PREFERRED EMBODIMENTS

Figure 1:
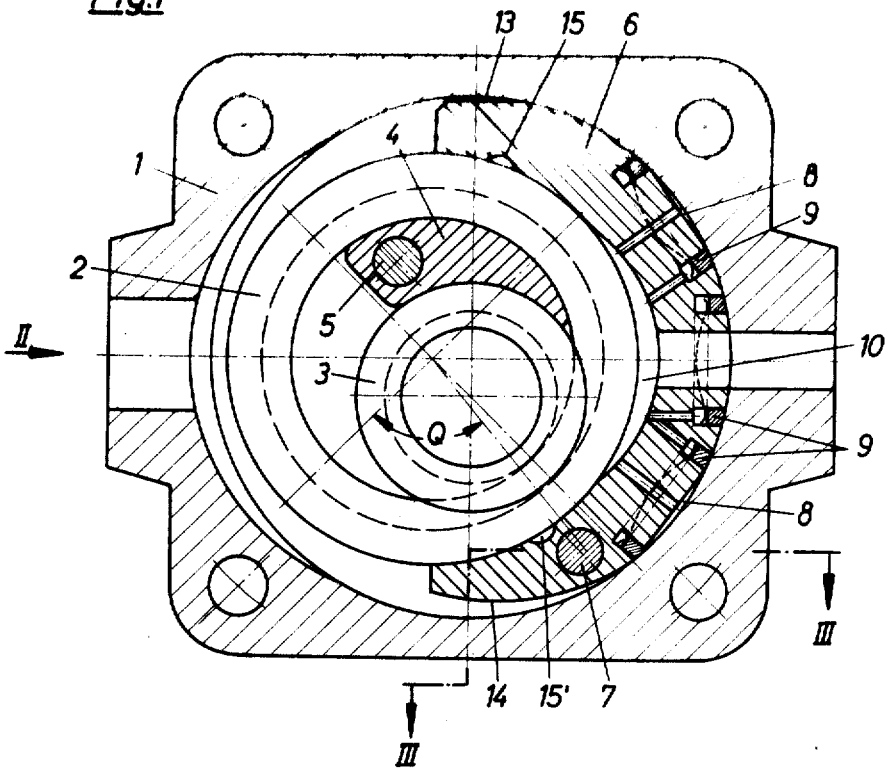
FIG. 1 is a cross-sectional view through a pump according to the present invention.
Figure 2:
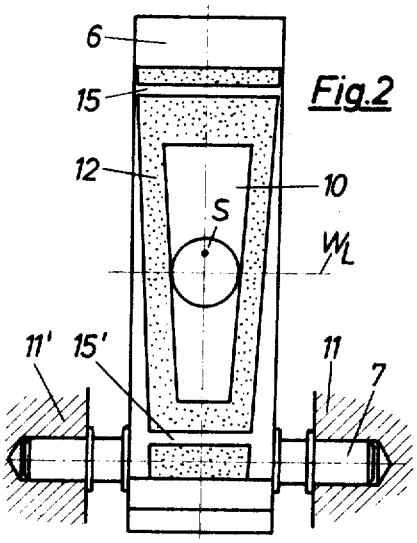
FIG. 2 is a top plan view of the control piston in the direction of the arrow II according to FIG. 1.
Figure 3:
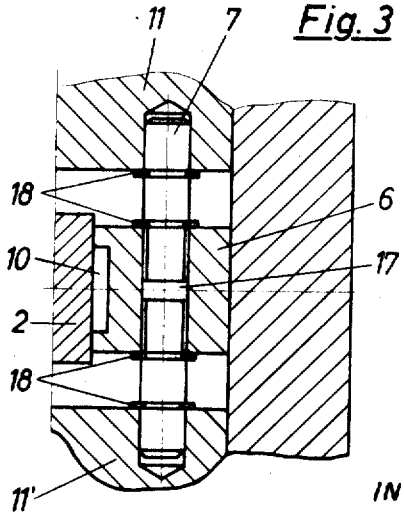
FIG. 3 is a cross-sectional view taken along line III—III of FIG. 1.

The pump shown in FIGS. 1 to 3 consists of the housing 1, the internal gear *ring* 2 rotating with the driven pinion 3, and the sickle-shaped filler member 4 which is [movably] *pivotably* positioned on the [bolt] *pin* 5. Disposed in the eccentrically [provided] *bored* housing 1 between the internal gear *ring* 2 and the housing bore is the control piston 6 which is [rotatably but not displaceably positioned, by means of] *arranged to be pivotable around* a pin 7, *which is located* in proximity to the tooth engagement within the angular range Q. Pressure fields 8 which are delimited by ring pistons 9 and are slightly greater in the sum total [thereof] *of axial*

*compensation thrust* than the [pressure forces] *radial hydraulic thrust* acting from within upon the internal gear *ring* 2 are disposed at the outside diameter of the control piston 6.

These pressure fields [rotate] *pivot* the control piston 6 about the pin 7 [which presses], *thereby pressing* the internal gear *ring* 2 with a small amount of force [upon the movably disposed] *against the pivotable* filler member 4. The filler member 4 [moves] *pivots* toward the pinion 3 until [abutment or] bearing contact is achieved. The circumferential gaps *between the gear teeth and the filler member 4* are thus [compensated] *eliminated.* [A relieving] *An intermediate compensation pressure* field 12 disposed between the control piston 6 and the internal gear *ring* 2 is so designed that the internal gear *ring* 2 will [abut or] bear with certainty against the control piston 6, [and not in] *but not against* the *tooth* flanks of the pinion [shaft 3'] *3*. An arrangement of the [center of rotation] *pivot center,* represented by the pin 7, on the geometrical axis extending through the two centers of the pinion 3 and the internal gear *ring* 2 is not advantageous since, due to the pressure field variations (caused by the different positions of the teeth) within the internal gear *ring* 2 at the [sealing] *parting* points at the [height] *tip* of the filler member 4 and in the tooth engagement, a double change of momentum [takes] *would take* place which acts in the same direction and [results] *would result* in greatly fluctuating surface [compressions] *pressures* between the [addendum circle] *tooth crowns* of the internal gear *ring* and the filler member. The [center of rotation] *pivot center* should *therefore* be [disposed] *arranged* outside of the angular range being [charged with] *subjected to hydraulic* pressure, i.e. preferably within the angular range Q. The control piston 6 encloses preferably approximately 180° of the circumference of the internal gear *ring*. A stable, vibration-damping positioning of the internal gear *ring* is thereby obtained. In order to keep the [extent or volume] *effect* of the [relieving] *compensation pressure* field 12 nevertheless within the desired range, transverse groove 15 and 15' are provided [for, which are subjected to suction pressure] *on the control piston and which communicate with the suction side of the pump.* The outer diameter of the control piston 6 is reduced at the end 13 and [/or] 14 of the control piston so that the compensation *movement* not be prevented.

The [relieving] *intermediate compensation pressure* field 12 and the [oil pocket] *fluid space* 10 are so designed that the surface [center of gravity] *centroid* S is positioned above the [line of application or effective curve $W_L$] *center line of radial hydraulic thrust,* i.e., outside the area which is defined by the [line of application or effective curve $W_L$] *center line of radial hydraulic thrust* and the tooth engagement. As a result, the internal gear *ring* 2 will [run up] *bear* with certainty [at or] against the gliding surface of the [relieving] *control piston 6 enclosing th ecompensation pressure* field 12 and assure the sealing *engagement* of the tooth system with flank clearance.

The pin 7 being rotatably poitioned in the lateral housing part 11 and [/or] 11' [assumes] *assures* not only the [rotatable] *pivotable* positioning of the control piston 6, but also the axial [central fixation] *centering* thereof. Snap rings 18 which secure the control piston 6 in the central position [thereof] are provided in [perforations or apertures] *grooves* of the pin 7. The pin 7 has a collar 17 in [the] *its* center [thereof]. By virtue of the short guidance [thereof] *by collar 17,* the control piston can be aligned *and radially displaced* toward the internal gear ring 2 within a limited range. A spherical configuration of the pin 7 can be used to obtain the same [purpose] *result.*

Figure 4:
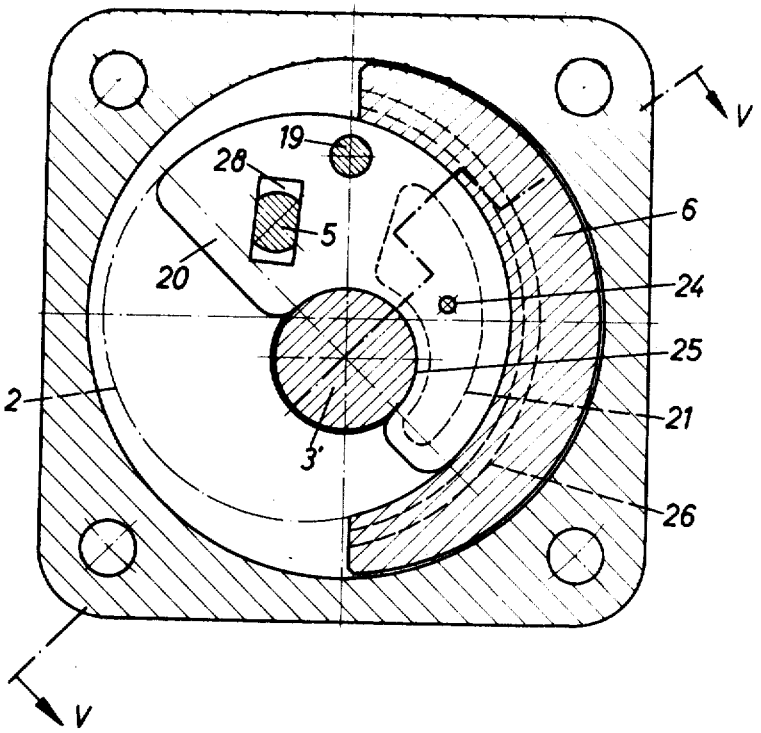
FIG. 4 illustrates a further pump in a cross-sectional view.
Figure 5:
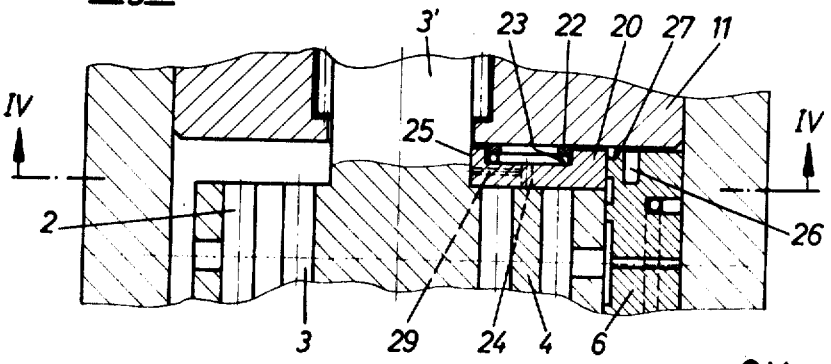
FIG. 5 is a cross-sectional view taken along line V—V of FIG. 4.

In the embodiment shown in FIGS. 4 and 5, a considerable portion of the load which normally acts upon the filler member is transferred from the control piston to the axial disk and the [fastening] *positioning* pin thereof, as well as to the pinion shaft.

The control piston 6 is supported on the axial disk 20 which is [rotatably] *pivotably* positioned [about] *on* the pin 19 *mounted* in the housing parts 11 and 11' [, respectively]. Disopsed on the [side facing away from the gearing] *outer side of the axial disk 20* is a recess 21 which is supplied with pressure oil from the pressure space via the bore 24, and which is sealed by means of a piston 22 and an O-[shaped] ring 23.

The axial piston 22 is [perforated in the direction] *open* toward the axial housing parts 11 and 11', [respectively,] whereby a hydrostatic [relief or] balancing of the axial disk 20 both toward the [gearing] *pump parts* 2, 3, 4 and toward the axial housing parts 11 and [/or] 11' is effectively obtained. During a *yielding* movement of the [gearing] *pump parts* (deflection of the pinion shaft 3'), the control piston 6 is thus adapted at all times to push the axial disk 20 [behind] *onto* the pinion shaft 3. The *tooth* flank clearance between the pinion 3 and the internal gear *ring* 2 is assured by virtue of the fact that the control piston 6 is secured in position within the housing and, respectively, in the housing parts 11 and [/or] 11' by means of a pin, as shown in FIG. 1 or in FIG. 10. The [compression] *pressure* and therewith the wear [and tear or abrasion] of the internal gear *ring* 2 on the filler member 4 may be reduced, in this embodiment, in that a part of the radial [charge or] load is transferred from the control piston 6 via the axial disk 20 to the pinion shaft 3'. For this purpose it is necessary, however, that the dimensions be accurately coordinated in order to assure both the [abutment or] bearing contact of the internal gear *ring* 2 on the filler member 4 and the [abutment or] bearing contact of the axial disk 20 on the pinion shaft 3'.

There are two possibilities for [solving this problem. The] *achieving this result. In one case the* filler member is initially made slightly thicker so that the [abutment or] bearing contact [of] *between* the control piston 6, the internal gear *ring* 2, the filler member 4 and the [addendum circle] *tooth crowns* of the pinion is assured. The pump is fully operative. After a certain running-in [abrasion of] *wear on* the filler member 4, the control piston 6 will also [make contact with or bear upon] *be supported on* the pinion shaft 3' [with] *by way of* the axial disk 20. The gliding surface 25 between the axial disk 20 and the pinion shaft 3', and the gliding surface between the filler member 4 and the internal gear *ring* 2 will then wear simultaneously. Hence, the surface [compressions and the abrasion] *pressure and resultant wear* are considerably lower, while an optimum sealing effect is nevertheless assured.

Another possibility for bridging the tolerances consists in that the support of the control piston 6 is provided so as to be elastic via the axial disks 20. For this purpose, the control piston 6 [is equipped with a perforation or aperture] *has an axial annular recess* 26 so that an elastic collar 27 is formed which presses resiliently on the axial disk 20. In FIG. 4, the [movable suspension] *pivotable mounting* of the filler member 4 is achieved by means of a [bolt 5 upon] *pin 5 on* which the filler member 4 is [rotatably] *pivotably* mounted. The pin 5 [is flangedly connected and] glides within a slot 28 of the axial disk 20. This affords the advantage that the axial disk 20 is [rotated] *pivoted* about the pin 19 due to the filler member load [or charge] and will come to [abut gainst or] bear on the piston shaft 3' even when the filler member 4, during the running-in-period, [still assume alone the charge or] *has to support the entire* load from the pressure field of the control piston 6. It is thereby possible to obtain a [feed or] pressure lubrication of the gliding surface 25 of the axial disk 20 on the pinion shaft 3' via the bore 24 and the bore 29, without accepting in exchange therefor a greater loss during the running-in period of the pump.

Figure 6:
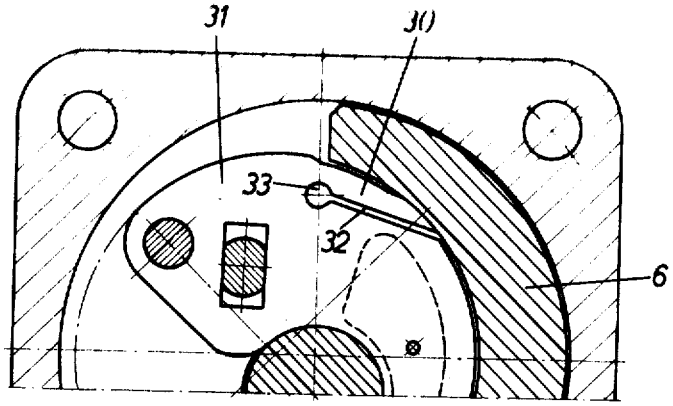
FIG. 6 is a modified embodiment of the pump according to FIG. 4.

FIG. 6 shows a further possibility of the elastic support of the control piston 6 on the axial disk. In this embodiment, the surface element 30 of the axial disk 31 is [caused to be] *made* elastic by means of the slot 32 and the bore 33. The support of the control piston 6 within the *angular range of* tooth engagement is [effected via] *obtained by means of* a pin, as shown in FIG. 1 or in FIG. 10.

Figure 7:
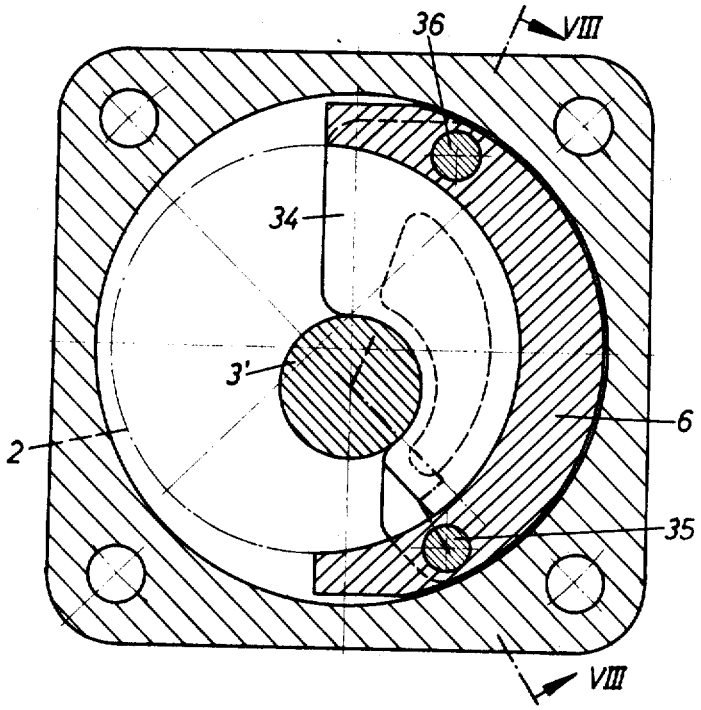
FIG. 7 is a cross-sectional view through another pump.
Figure 8:
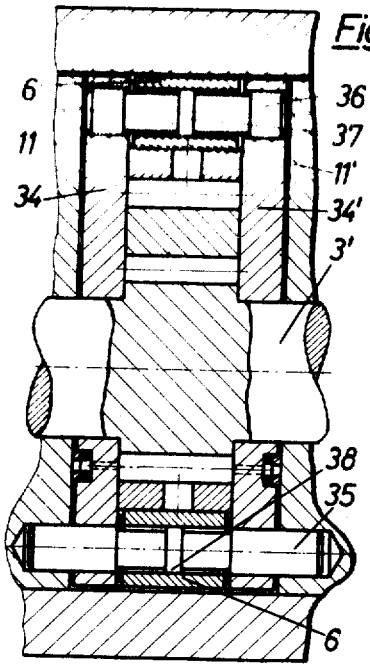
FIG. 8 is a cross-sectional view taken along line VIII—VIII of FIG. 7.

Another modified embodiment relative to the support of the control piston is illustrated in FIGS. 7 and 8. The control piston 6 and the two axial disks 34 and 34' are [rotatably] *pivotably* positioned [at] *on* the pin 35 which engages in the two housing parts 11 and 11'. A second pin 36 connects the control piston 6 with the axial disks 34 and 34' without, however, engaging in the axial housing parts 11 and 11'. The *radial* support of the control piston 6 is again effected via the axial disks on the pinion shaft 3'. Both the pin 35 and the pin 36 are preferably provided with a short collar 37 and [/or] 38 in order not to impair the adjustment [or setting] of the control piston 6 on the internal gear *ring* 2.

Figure 9:
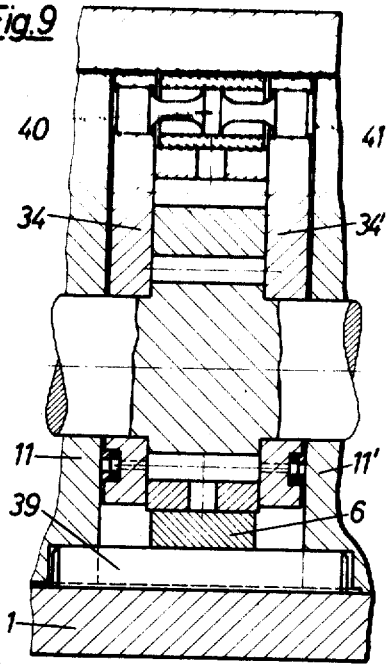
FIG. 9 is a modified embodiment of FIG. 8 in a cross-sectional view taken along the line IX—IX of FIG. 10.
Figure 10:
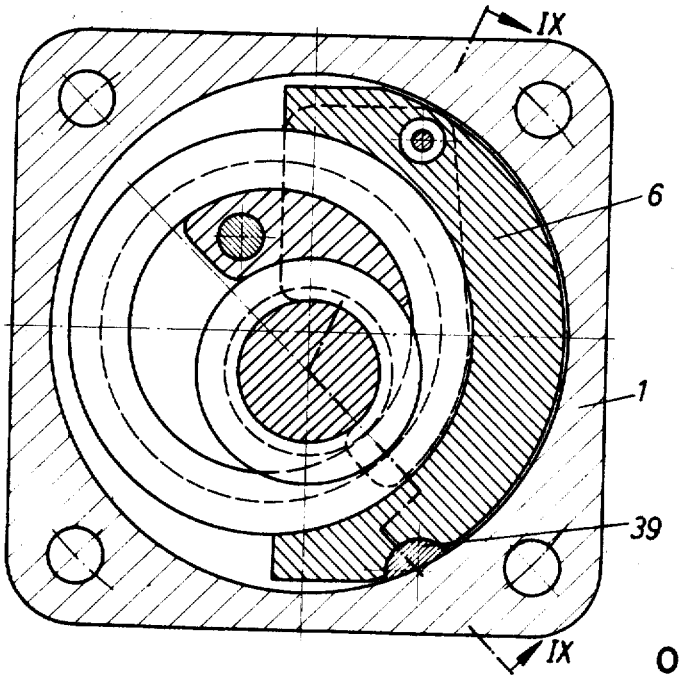
FIG. 10 is a cross-sectional view taken along line X—X of FIG. 9.

FIGS. 9 and 10 represent a similar construction. In this case, a semicircular pin 39 is fixed in the [circumferential direction in] *housing bore periphery of* the axial housing parts 11 and [/or] 11', this pin bearing on the inner wall of the housing 1. The advantage of this particular provision consists in the stable positioning of the [center of rotation] *pivot center* for the control piston 6 which is [unsusceptible] *thus less susceptible* to vibrations. A further noteworthy consideration is the simple solution for the resilient support [or seating] of the control piston 6 on the axial disks 34 and 34' which is obtained, according to FIG. 9, by means of a [markedly attenuated] pin 41 *which is considerably weakened* on both sides of the collar 40 [in] *on which it carries* the control piston 6.

Figure 11:
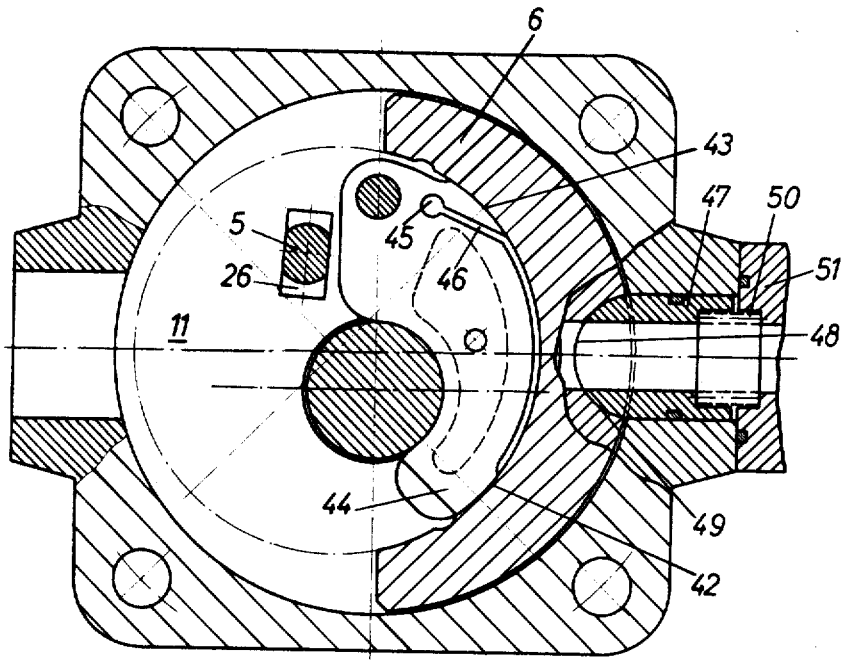
FIG. 11 is a further modified embodiment of FIG. 6.

FIG. 11 illustrates a pump with a further modified embodiment of the radial [force] *hydraulic thrust* compensation. The control piston 6 is supported on two surfaces 42 and 43 on the axial disk, and specifically in *the angular range of* tooth engagement on the surface element 42, so that a specific *tooth* flank clearance is maintained [and effectively assured], and on the surface element 43 which is [provided so as to be] *made* resilient by means of the bore 45 and the slot 46. In this case, the pin 5 [serving for the suspension of the filter member] engages in a slot 26 in the housing part 11. This has the advantage that the axial *pressure* compensation is not disturbed by the filler member load [or charge]. , The suspension of the control piston 6 is accomplished by means of a [circular] *tubular* piston 47 which has, at its end on the side of the control piston, a [sphere] *spherical portion* 48 which engages in a corresponding spherical [indentation] *recess* 49 of the control piston 6. This *tubular* piston 47 secures the control piston 6 in the [rotating] *angular* direction, while a free adjustment of the control piston 6 [on the gearing by means of the sphere] *relative to the gears is* nevertheless possible. During the idling motion, a spring 50 which is clamped in-between the pressure connection cover 51 and the piston 47 presses this piston and therewith the control piston 6 against the [gearing] *gears*.

The drawings and the foregoing [specifications] *specification* are directed to a [machine] *gear pump* in which the oil is [supplied from the housing] *pumped* via radial bores in the internal gear *ring* 2 and *exits from the housing radially* via the control piston 6. It is understood, however, that the basic teachings and the solutions proposed hereinabove may also be [transferred to and applied for machines] *used in gear pumps* having an axial outlet.

Obviously many modifications and variations of the present invention are possible in the light of the above teachings. It is therefore to be understood, that within the scope of the appended claims, the invention may be practiced otherwise than as specifically described.

What is claimed is:

1. Wear [and tear-] compensating [heavy-duty] *high-pressure* gear pump comprising:

*a pump housing with a housing bore, a pressure inlet duct, a pressure outlet duct, and at least one removable end cover,* a driven externally-geared pinion *and pinion shaft which is journalled in said pump housing,* a concomitantly rotating internally-geared [wheel] *ring,* a [movable] *pivotable* sickle-shaped filler member between the pinion and the internal gear *ring,* and at least one axial disk laterally covering the gears,

[as well as an insert member called "control piston"] *a control piston* being disposed *inside the housing bore* on the pressure side of the gears and radially displaceably arranged with respect thereto, enclosing the outer circumferential surface of the internal gear *ring* within a specific angular range [and touching the latter as the sole stator part] *so as to position the latter,* said control piston containing the first portion of the pressure outlet duct [, being relieved for the major part with respect to radial forces and hence] *and including means for hydraulically compensating the radially outward-directed thrust on the internal gear ring and on the control piston, said compensation means being so arranged that the control piston is* pressing against the circumference of the internal gear ring with [only] a limited [amount of excess] force,

[characterized in that the control piston 6 is rotatably but not displaceably positioned in proximity to the tooth engagement of the two gears 2, 3, that the center of rotation is disposed outside of the relieving field 12 being under pressure between the internal gear 2 and the control piston, and that the relieving field is so provided that the surface center of gravity S thereof is positioned above the line of application or effective curve $W_L$ of the radial compensating forces] *said hydraulic thrust compensating means including a compensation pressure field arranged intermediate said internal gear ring and said control piston in the angular region which includes the center line of radial hydraulic thrust on the internal gear ring, and at least one compensation pressure field for the control piston arranged between said control piston and the housing bore in the same angular region,*

*said intermediate pressure compensation field having its area centroid located angularly ahead of said thrust centerline relative to the midpoint of a tooth engagement.*

*said control piston further including means for radially positioning it relative to the center of said internal gear ring in such a way that the radial position of the control piston is fixed at a point within the angular quadrant behind the midpoint of tooth engagement so as to maintain a substantially constant tooth engagement clearance, and that the control piston is radially displaceable toward the internal gear ring in the angular region ahead of said midpoint of tooth engagement, said radial fixpoint being located angularly outside said intermediate pressure compensation field.*

2. High-pressure gear pump according to claim 1, characterized in that *said radial positioning means of the control piston includes* a *pivot* pin [7] which engages *axially* in the [axial] housing [parts 11 11' is provided within] *and traverses* the control piston [with spherical means] *in the angular quadrant*

*behind the midpoint of tooth engagement* to serve as *pivot* center [of rotation] for the control piston [6], *said pivot pin engaging the control piston by means of a narrow central shoulder.*

3. High-pressure gear pump according to claim 1, characterized in that *said radial positioning means of* the control piston [6 is supported on] *includes* a semicircular pin [39] which bears on the [inner] housing bore wall [and is guided in], *the pin being angularly positioned by* the axial housing parts [11, 11'] *and engaging a matching peripheral recess in the control piston.*

4. High-pressure gear pump according to claim 1, characterized in that [the relieving field 12 in] *said intermediate compensation pressure field between the internal gear ring and* the control piston [6] is provided [conical] *in a generally trapezoidal outline* and delimited by two transverse grooves [15, 15' being under suction pressure] *which communicate with the suction side of the pump,*

*said generally trapezoidal compensation pressure field having its area centroid located angularly ahead of the center line of radial hydraulic thrust relative to the midpoint of tooth engagement.*

5. High-pressure gear pump according to claim 1, characterized in that the control piston [6] encloses the internal gear *ring* [2] within an angular range of approximately 180° and [is set off at the ends within the area of the outer circumference 13, 14] *is shaped to leave a small gap between its outer periphery and the housing bore, the end portions of the control piston contour being reduced in dimension to facilitate the control piston displacement.*

6. High-pressure gear pump according to claim 1, characterized in that *it includes two axial disks arranged laterally between the gears and the housing, and*

*the filler member includes a pivot pin which extends through the axial disks, the pivot pin being displaceable relative to the axial disks in an oblique radial direction only,* the control piston [6] *including on each side a lateral collar which bears on the axial disk so that the control piston* is supported *in the angular region ahead of said midpoint of tooth engagement* not only on the internal gear *ring* [2 via a collar 27], but also on the lateral axial disks [20 in which latter the filler member bolt 5 is displaceably positioned], the axial disks [20] being [rotatably suspended on a pin 19] *pivotable around a pivot point located outside of said angular region of control piston support* and bearing on the pinion shaft [3'] with a cylindrical gliding surface [25].

7. High-pressure gear pump according to claim 6, characterized in that [the collar 27 is] *said lateral collars are* made elastic by means of [a perforation or aperture 26] *axial recesses* in control piston.

8. High-pressure gear pump according to claim [6] 7, characterized in that the part of the axial disks [31] on which the control piston [6] bears is made elastic by means of a slot [32] changing over into a bore [33].

9. High-pressure gear pump according to claim 6, characterized in that the filler member [4], when new, has a slightly greater [outside diameter] *radial thickness* than *the thickness that would be* necessary *for simultaneous support of the control piston by the internal gear ring and by the axial disks* so that the internal gear *ring* [2 being pressed on by the control piston 6 will initially run up on] *and* the *oversize* filler member *are subjected to higher loads during the running-in of the pump, thereby wearing-in the filler member* [before] *until* the axial disks [20, 31 is] *are* supported on the [platoon] *pinion* shaft [3'] *and the control piston bears on the axial disks.*

10. High-pressure gear pump according to claim 6, characterized in that the *axial disks radially overlap with the* control piston [6 is supported on the pinion shaft via a pin and via the axial disks 34, 34'],

*the control piston including an axial pin which extends through the axial disks and the control piston so as to support the latter on the pinion shaft via the axial disks.*

11. High-pressure gear pump according to claim 6, characterized in that *said radial positioning means of* the control piston [6 is supported] *includes a lower raised peripheral support portion* on the axial [disk 44 both in the area of the] *disks which includes said radial fixpoint which is located in the angular quadrant behind the midpoint of* tooth engagement,

[and also at the opposit end via two surfaces 42, 43] *said axial disks further including an elastic upper raised peripheral support portion for the control piston collar.*

12. High-pressure gear pump according to claim 1, characterized [by a] *in that said hydraulic thrust compensating means includes as a compensation pressure field for the control piston* a central *tubular support* piston [47 being] *which is arranged substantially in the mid-axis of the control piston, being* guided in the housing [1] *for radial motion* and loaded by a spring [51], said *support* piston being provided at [the] *its* inner end [thereof] with a spherical *support* surface [48 engaging in a spherical indentation 49 of], the control piston [6] *being provided with a matching spherical recess by which it is pivotably positioned on the tubular support piston.*

References Cited

The following references, cited by the Examiner, are of record in the patented file of this patent or the original patent.

UNITED STATES PATENTS

| | | | |
|---|---|---|---|
| 1,719,639 | 7/1929 | Wilsey | 418—169 |
| 3,273,502 | 9/1966 | Martz | 418—6 |
| 3,289,599 | 12/1966 | Eckerle et al. | 418—126 |
| 3,315,608 | 4/1967 | Eckerle | 418—72 |
| 3,315,609 | 4/1967 | Eckerle | 418—169 |

CARLTON R. CROYLE, Primary Examiner

J. J. VRABLIK, Assistant Examiner

U.S. Cl. X.R.

418—126, 169, 170